United States Patent
Guzik et al.

(10) Patent No.: US 10,694,836 B2
(45) Date of Patent: Jun. 30, 2020

(54) MAGNETIC MOUNT

(71) Applicant: GETAC TECHNOLOGY CORPORATION, Hsinchu County (TW)

(72) Inventors: Thomas Guzik, Taipei (TW); Ssu-Yuan Wu, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 2 days.

(21) Appl. No.: 16/148,123

(22) Filed: Oct. 1, 2018

(65) Prior Publication Data
US 2020/0015576 A1 Jan. 16, 2020

Related U.S. Application Data

(60) Provisional application No. 62/696,228, filed on Jul. 10, 2018.

(51) Int. Cl.
*A45F 5/02* (2006.01)
*A44B 99/00* (2010.01)

(52) U.S. Cl.
CPC ............... *A45F 5/02* (2013.01); *A44B 99/00* (2013.01); *A44D 2203/00* (2013.01); *A45F 2200/0533* (2013.01)

(58) Field of Classification Search
CPC ............... A45F 5/02; A45F 2200/0533; A44D 2203/00; A44B 99/00
See application file for complete search history.

(56) References Cited

U.S. PATENT DOCUMENTS

| | | | |
|---|---|---|---|
| 5,369,899 A | 12/1994 | Reeves | |
| 6,446,372 B1 | 9/2002 | Reeves | |
| 9,345,433 B1 | 5/2016 | Shinozuka et al. | |
| 9,990,867 B1 * | 6/2018 | Shiao | G09F 7/04 |
| 10,172,401 B1 * | 1/2019 | Hopper | A41F 1/002 |
| 2008/0250677 A1 | 10/2008 | O'Leary | |
| 2011/0079619 A1 | 4/2011 | Lewis | |

* cited by examiner

*Primary Examiner* — Robert Sandy
*Assistant Examiner* — David M Upchurch

(57) ABSTRACT

A magnetic mount includes a base and a fixing member. The base includes a lower plate body, an upper stop plate, a lower stop plate and two side stop plates. The upper stop plate and the lower stop plate are respectively provided at a top edge and a bottom edge of the lower plate body, and the two side stop plates are respectively provided at two opposite side edges of the lower plate body. The fixing member includes a base plate and a fixing structure. The base plate has a front surface and a back surface facing each other, wherein the back surface is adapted to be magnetically attached on the lower plate body, and the fixing structure is provided at the front surface and for fixing a media recording device.

21 Claims, 6 Drawing Sheets

MAGNETIC MOUNT

CROSS-REFERENCE TO RELATED APPLICATIONS

This application claims priority from U.S. Patent Application Ser. No. 62/696,228, filed on Jul. 10, 2018, the entire disclosure of which is hereby incorporated by reference.

BACKGROUND OF THE INVENTION

Field of the Invention

The present invention relates to a fixing device, and more particularly, to a magnetic mount for fixing a media recording device on a garment.

Description of the Prior Art

With the current social progress, criminal activities are also getting increasingly severe. Therefore, video surveillance devices have become critical equipment for environment safekeeping, and can provide further support for questioning suspicious individuals during patrols of security staff or police offers and provide evidence and data for later fact clarification when needed.

Current video surveillance recorders carried by security staff or police officers are fixed on garments. When security staff or police officers need to run or perform drastic movements during patrol, such video surveillance recorders originally secured on garments may fail to stay secured on garments or may fall off due to running, causing investigation and evidence collection inconveniences.

SUMMARY OF THE INVENTION

The present invention provides a magnetic mount that prevents, through an upper stop plate and a lower stop plate, a fixing member from sliding relative to a base.

A magnetic mount according to an embodiment of the present invention is adapted for fixing a media recording device on a garment, and includes a base and a fixing member. The base includes a lower plate body, an upper stop plate and a lower stop plate. The lower plate body has an upper surface, and a top edge and a bottom edge facing each other. The upper stop plate and the lower stop plate are respectively provided at the top edge and the bottom edge. The fixing member includes a base plate and a fixing structure. The base plate has a front surface and a back surface facing each other. The back surface is adapted to be magnetically attached to the upper surface of the lower plate body. The fixing structure is provided at the front side and for fixing the media recording device.

A magnetic mount according to an embodiment of the present invention is adapted for fixing a media recording device on a garment, and includes a base and a fixing member. The base includes a lower plate body, which has an upper surface. The fixing member includes a base plate, a fixing structure, an upper stop plate and a lower stop plate. The base plate has a front surface and a back surface facing each other, and a top edge and a bottom edge facing each other. The upper stop plate and the lower stop plate are provided respectively at the top edge and the bottom edge. The fixing structure is provided at the front side and is for fixing the media recording device. The upper surface of the lower plate body is adapted to be attached to the back surface of the base plate.

The magnetic mount effectively prevents, by adopting the upper stop plate and the lower stop plate provided on the base or on the fixing member, the fixing member from sliding relative to the base, such that the media recording device fixed on the fixing member may stay fixed on a user garment to perform recording without interruption, further enhancing investigation or evidence collection efficiency.

To better understand the above and other objects, features and advantages of the present invention, details are given in the embodiments with the accompanying drawings below.

DETAILED DESCRIPTION OF THE EMBODIMENTS

Figure 1:
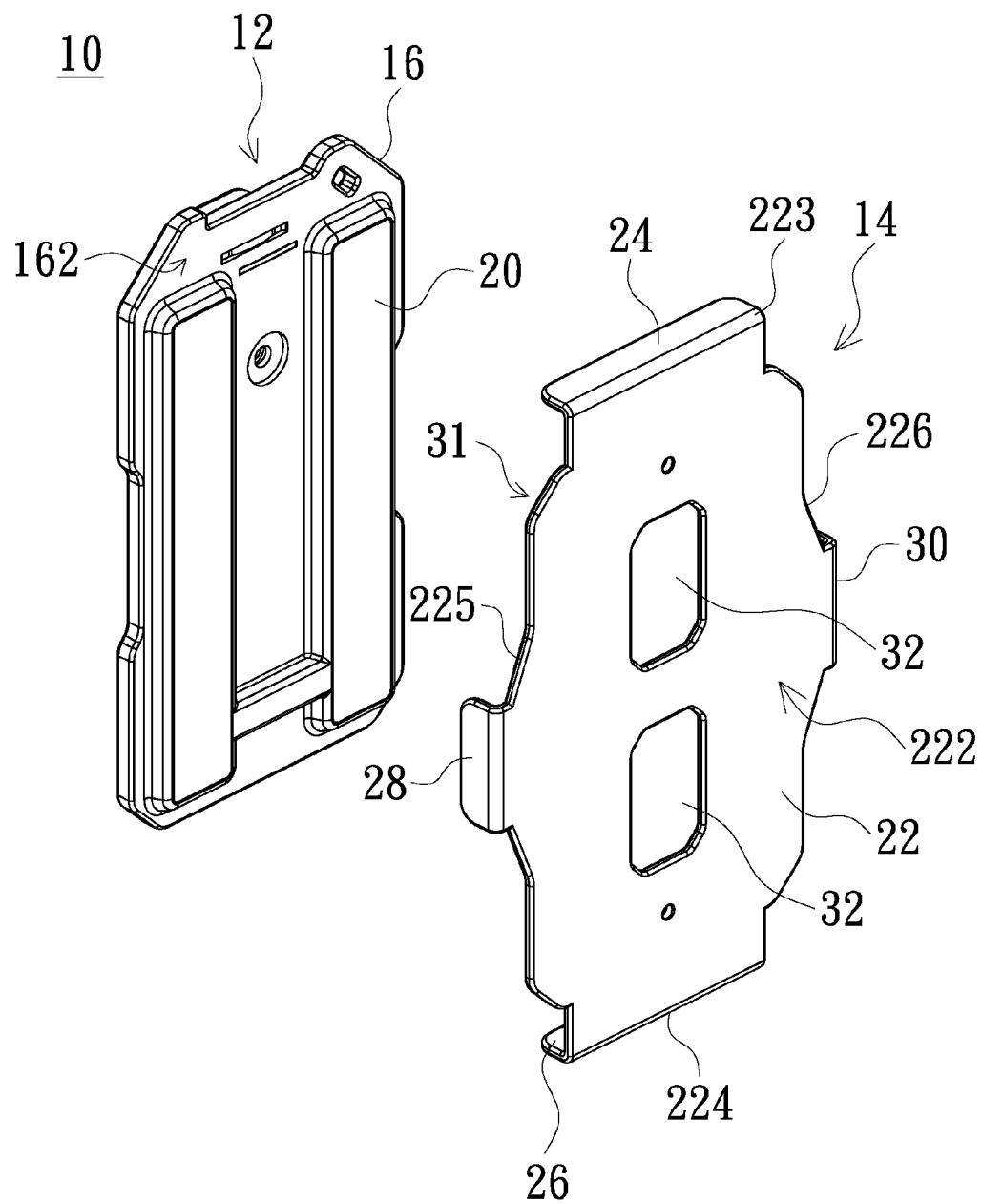
FIG. 1 is an exploded structural schematic diagram of a magnetic mount according to a first embodiment of the present invention.
Figure 2:
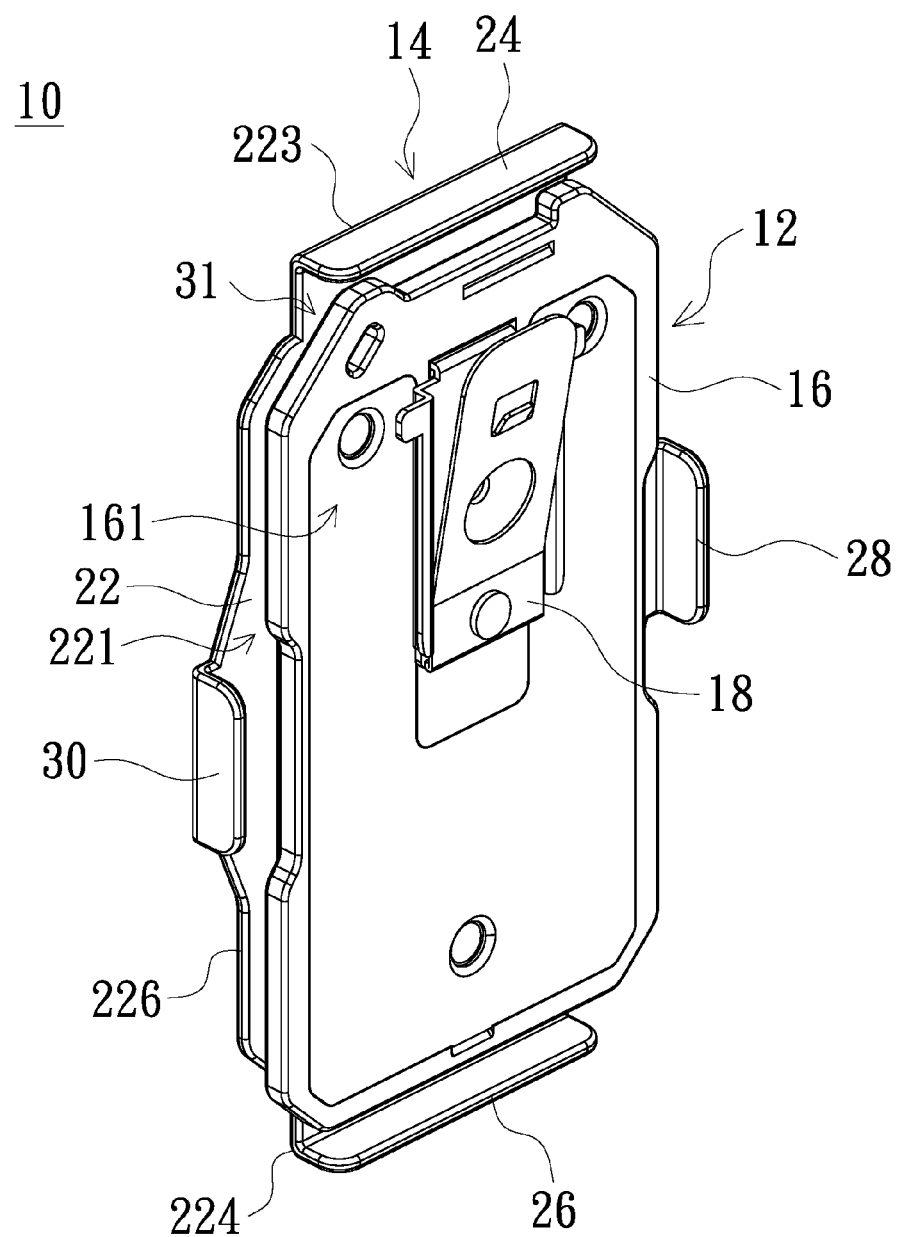
FIG. 2 is an assembly schematic diagram of the magnetic mount in FIG. 1 from another perspective.

FIG. 1 shows an exploded structural schematic diagram of a magnetic mount according to a first embodiment of the present invention. FIG. 2 shows an assembly schematic diagram of the magnetic mount in FIG. 1 from another perspective. As shown in FIG. 1 and FIG. 2, the magnetic mount 10 includes a fixing member 12 and a base 14. The fixing member 12 includes a base plate 16, a fixing structure 18 and a magnetic member 20. The base plate 16 has a front surface 161 and a back surface 162 facing each other. The fixing structure 18 is provided at the front surface 161 of the base plate 16, and is for fixing a media recording device (not shown), which is, for example, a video surveillance recorder. The magnetic member 20 is provided at the back surface 162 of the base plate 16, and is, for example, two strip-shaped magnets provided in parallel at the back surface 162. The base 14 is made of, for example, a metal material, and includes a lower plate body 22, an upper stop plate 24, a lower stop plate 26 and two side stop plates 28 and 30. The lower plate body 22 appears slightly rectangular in shape, and has an upper surface 221 and a lower surface 222 facing each other, a top edge 223 and a bottom edge 224 facing each other, and two side edges 225 and 226 facing each other. The upper stop plate 24 and the lower stop plate 26 are respectively provided at the top edge 223 and the bottom edge 224, and face each other. In one embodiment, the upper stop plate 24 and the lower stop plate 26 are, for example, perpendicular to the lower plate body 22. The side stop plates 28 and 30 are respectively provided at the two side edges 225 and 226 of the lower plate body 22. The upper stop plate 24, the lower stop plate 26 and the side stop plates 28 and 30 form a first position limiting space 31 at the upper surface 221 of the lower plate body 22. An area of the first position limiting space 31 is greater than an area of the base plate 16 of the fixing member 12. In one embodiment, the two side edges 225 and 226 of the lower plate body 22 appear slightly wave-shaped to facilitate holding. The two side stop plates 28 and 30 are respectively provided at middle positions of the side edges 225 and 226.

As shown in FIG. 1 and FIG. 2, the fixing member 12 can be attracted and attached at the upper surface 221 of the lower plate body 22 of the base 14 through the magnetic member 20 at the back surface 162 of the base plate 16. The fixing member 12 is blocked by the upper stop plate 24, the lower stop plate 26 and the side stop plates 28 and 30 at four sides of the lower plate body 22, and does not slide out of the base 14. In another embodiment, the weight of the fixing member 12 is greater than the weight of the base 14. To effectively reduce the weight of the base 14, a plurality of hollow parts 32 are provided on the lower plate body 22. Further, the above magnetic member 20 is not limited to being provided at the back surface 162 of the base plate 16 of the fixing member 12. In other embodiments, the magnetic member 20 may also be provided at the upper surface 221 of the lower plate body 22 of the base 14, so as to be attracted and attached to the base plate 16 of the fixing member 12. In another embodiment, the base plate 16 is, for example, magnetic, and so the magnetic member 20 can be omitted. In yet another embodiment, for example, the base 14 is magnetic and the base plate 16 is made of a metal material, and thus the magnetic member 20 can also be omitted.

Figure 3:
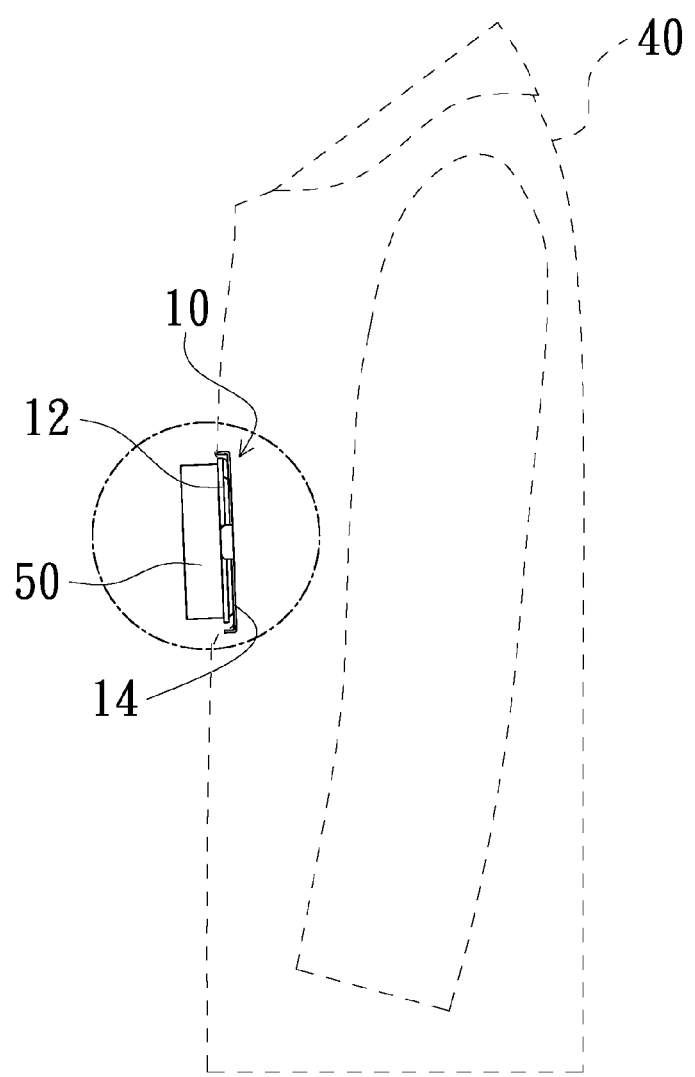
FIG. 3 is an application schematic diagram of a magnetic mount according to an embodiment of the present invention.
Figure 4:
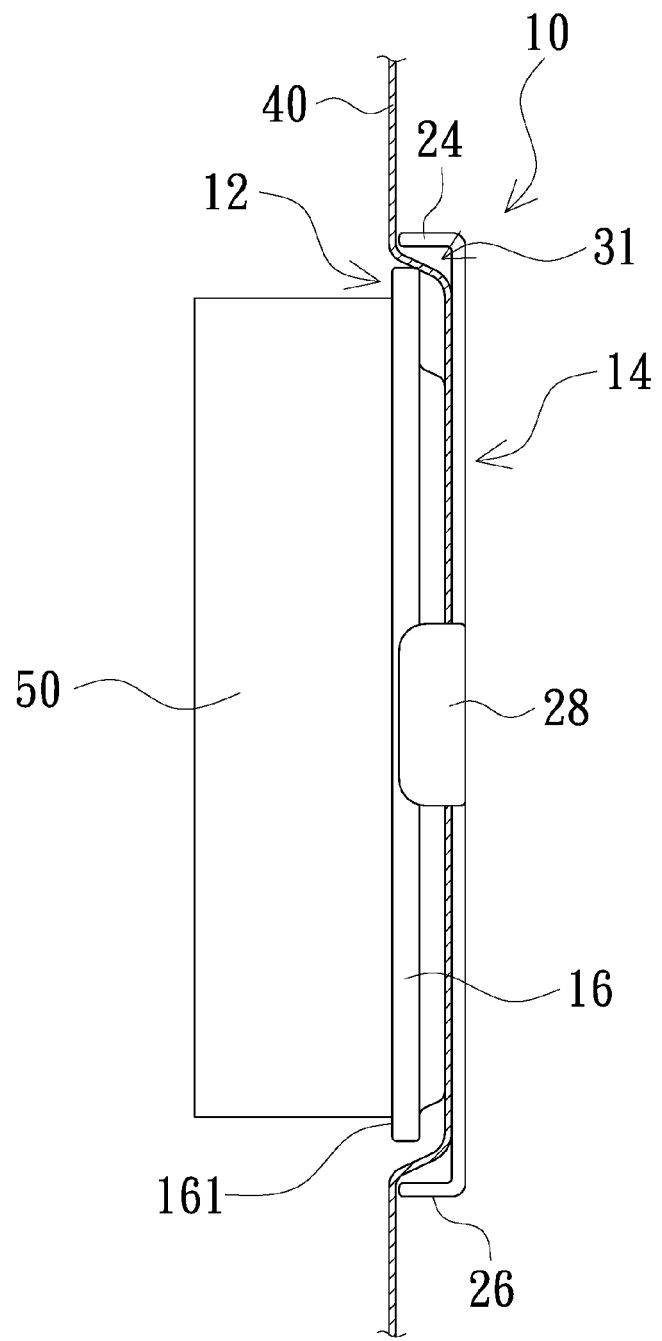
FIG. 4 is a partial enlarged schematic diagram of FIG. 3.

FIG. 3 shows an application schematic diagram of a magnetic mount according to an embodiment of the present invention. FIG. 4 shows an enlarged partial schematic diagram of FIG. 3. As shown in FIG. 3 and FIG. 4, the base 14 and the fixing member 12 are respectively provided at an inner side and an outer side of a garment 40 worn by a user, and are attracted and attached to the garment 40 in between through the magnetic force between the base 14 and the magnetic member 20 of the fixing member 12 and are accordingly fixed on the garment 40. Further, a media recording device 50 is provided at the front surface 161 of the base plate 16 of the fixing member 12 by using the fixing structure 18 (shown in FIG. 2). Because the area of the first position limiting space 31 of the base 14 is greater than the area of the base plate 16 of the fixing member 12, a space for clamping the garment 40 is reserved. Further, since the weight of the fixing member 12 is greater than the weight of the base 14, when the magnetic mount 10 is fixed on the garment 40, the fixing member 12 along with the media recording device 50 are naturally tilted forward due to the center of gravity, such that a lens of the media recording device 50 is tilted forward and slightly downward, allowing the media recording device 50 to perform video recording at all times while the user walks or runs.

In the above embodiments, the fixing member 12 for fixing the media recording device 50 is fixed on the garment 40 of the user through the magnetic attraction force between the fixing member 12 and the base 14. When the user walks or runs, the fixing member 12 may possibly slide due to friction. However, through the blocking effect of the upper stop plate 24, the lower stop plate 26 and the side stop plates 28 and 30 (only one side stop plate 28 is depicted in FIG. 4) at the four sides of the base 14, the fixing member 12 is effectively prevented from sliding out of the base 14, and falling off of the fixed media recording device 50 caused by the possible disengagement of the fixing member 12 and the base 14 is also prevented, thus avoiding any influence on the operation of the media recording device 50.

Figure 5:
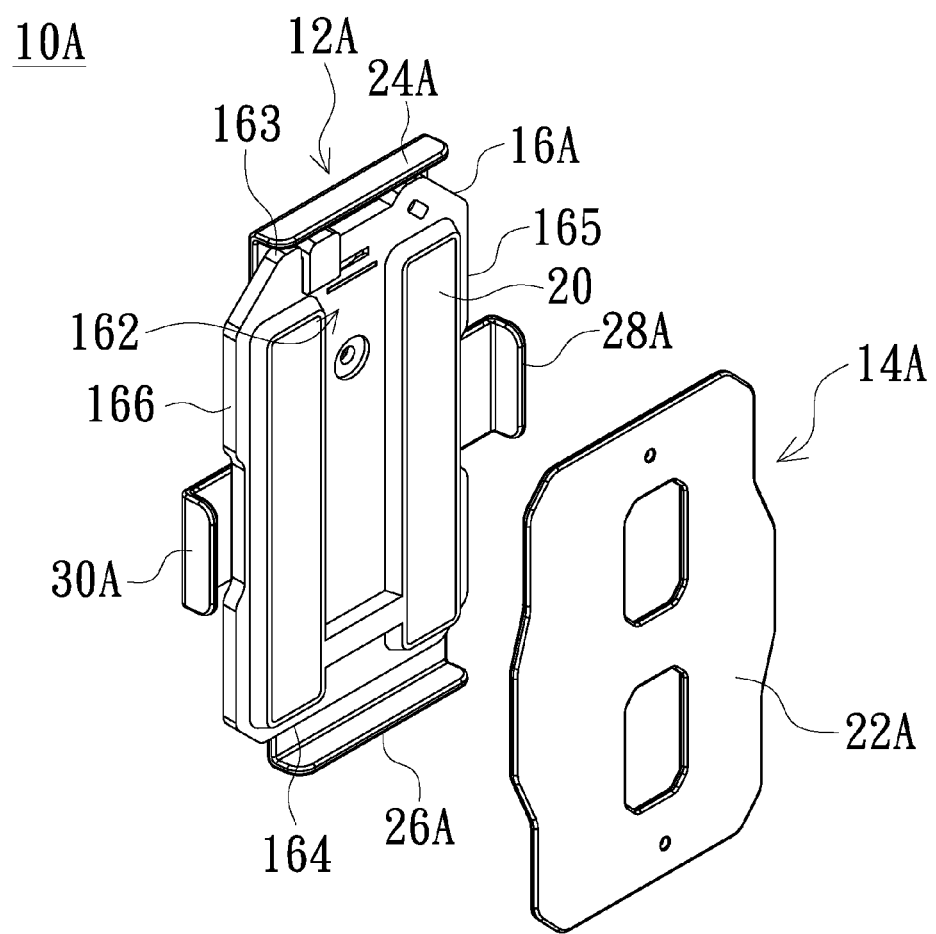
FIG. 5 is an exploded structural schematic diagram of a magnetic mount according to a second embodiment of the present invention.
Figure 6:
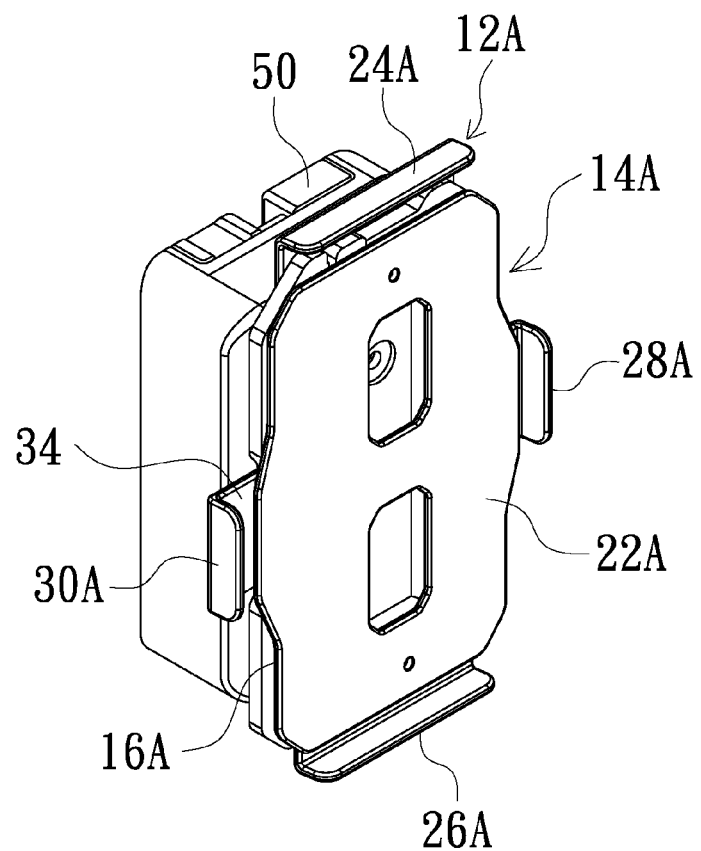
FIG. 6 is an assembly schematic diagram of the magnetic mount in FIG. 5.

FIG. 5 shows an exploded structural schematic diagram of a magnetic mount according to a second embodiment of the present invention. FIG. 6 is an assembly schematic diagram of the magnetic mount in FIG. 5. As shown in FIG. 5 and FIG. 6, a magnetic mount 10A includes a fixing member 12A and a base 14A. The second embodiment differs from the first embodiment in that, in the second embodiment, an upper stop plate 24A, a lower stop plate 26A and two side stop plates 28A and 30A are provided at the fixing member 12A but not at the base 14A. As shown in FIG. 5 and FIG. 6, the upper stop plate 24A and the lower stop plate 26A are respectively provided at a top edge 163 and a bottom edge 164 of a base plate 16A of the fixing member 12A, and the two side stop plates 28A and 30A are respectively provided at two opposite side edges 165 and 166 of the base plate 16A. Further, the upper stop plate 24A, the lower stop plate 26A and the two side stop plates 28A and 30A form a second position limiting space 34 at a back surface 162 of the base plate 16A. The base 14A includes a lower plate body 22A, which is made of a metal material and has an area slightly smaller than that of the second position limiting space 34. Same as the first embodiment, the magnetic member 20 is provided at the back surface 162 of the base plate 16A of the fixing member 12A, and the fixing structure 18 (shown in FIG. 2) is also provided at the front surface 161 of the base plate 16A.

As shown in FIG. 5 and FIG. 6, the lower plate body 22A may be attracted and attached to the base plate 16A through the magnetic member 20A of the base plate 16A and be located in the second position limiting space 34. When putting the magnetic mount 10A to application, the fixing member 12A fixes a media recording device (not shown) by using the fixing structure 18A, and the base 14A and the fixing member 12A are respectively provided at an inner side and an outer side of a garment (not shown) by a user and are attracted and attached together with the garment in between through the magnetic force between the base 14A and the magnetic member 20 of the fixing member 12A. Further, the magnetic member 20 is not limited to being provided at the back surface 162 of the base plate 16A of the fixing member 12A. In other embodiments, the magnetic member 20 may also be provided at the lower plate body 22A so as to be attracted and attached to the base plate 16A of the fixing member 12A.

In the magnetic mount according to the embodiments of the present invention, whether the upper stop plate, the lower stop plate and the two side stop plates are provided at the base or the fixing member, the fixing member is effectively prevented from sliding relative to the base, such that the recording media device fixed on the fixing member can stay fixed on the garment of a user to perform recording without interruption, further enhancing investigation or evidence collection efficiency.

While the invention has been described by way of example and in terms of the preferred embodiments, it is to be understood that the invention is not limited thereto. Various modifications and similar arrangements and procedures made by a person skilled in the art without departing from the spirit of the present invention are encompassed within the scope of the present invention, and the scope of the present invention therefore should be accorded with the broadest interpretation of the appended claims.

What is claimed is:

1. A mount, adapted for fixing a media recording device on a garment, the magnetic mount comprising:
   a base, comprising a lower plate body, an upper stop plate and a lower stop plate, the lower plate body having an upper surface and a top edge and a bottom edge facing each other, the upper stop plate and the lower stop plate respectively provided at the top edge and the bottom edge; and a fixing member, comprising a base plate and a fixing structure, the base plate having a front surface and a back surface facing each other, the back surface adapted to be magnetically attached to the upper surface of the lower plate body, the fixing structure provided at the front surface and for fixing the media recording device.

2. The mount according to claim 1, wherein the upper stop plate and the lower stop plate are perpendicular to the lower plate body, and the upper stop plate and the lower stop plate face each other.

3. The mount according to claim 1, wherein the lower plate body has two side edges facing each other, the two side edges adjacent to the top edge and the bottom edge, the base further comprising two side stop plates respectively provided at the two side edges facing each other.

4. The mount according to claim 3, wherein the upper stop plate, the lower stop plate and the two side stop plates form a first position limiting space at the upper surface of the lower plate body, and an area of the first position limiting space is greater than an area of the base plate of the fixing member.

5. The mount according to claim 3, wherein the two side edges of the lower plate body appear as wave-shaped structures, and the two side stop plates are respectively provided at middle positions of the side edges.

6. The mount according to claim 1, wherein the base is metal, and the fixing member further comprises a magnetic member provided at the back surface of the base plate.

7. The mount according to claim 1, wherein the base plate is metal, and the base further comprises a magnetic member provided at the upper surface of the lower plate body.

8. The mount according to claim 1, wherein one of the base plate and the base is metal, and the other is a magnetic material.

9. The mount according to claim 1, wherein the fixing member weighs more than the base.

10. The mount according to claim 1, a plurality of hollow parts are provided in the lower plate body of the base.

11. The mount according to claim 1, wherein the base and the fixing member are respectively provided at an inner side and an outer side of the garment, and the base and the fixing member are attracted and attached through the garment therebetween.

12. A mount, adapted for fixing a media recording device on a garment, the magnetic mount comprising:
a base, comprising a lower plate body, the lower plate body having an upper surface; and
a fixing member, comprising a base plate, a fixing structure, an upper stop plate and a lower stop plate, the base plate having a front surface and a back surface facing each other, the base plate having a top edge and a bottom edge facing each other, the upper stop plate and the lower stop plate respectively provided at the top edge and the bottom edge, the fixing structure provided at the front surface and for fixing the media recording device, wherein the upper surface of the lower plate body is adapted to be magnetically attached to the back surface of the base plate.

13. The mount according to claim 12, wherein the upper stop plate and the lower stop plate are perpendicular to the base plate, and the upper stop plate and the lower stop plate face each other.

14. The mount according to claim 12, wherein the base plate has two side edges facing each other, the two side edges are adjacent to the top edge and the bottom edge, and the fixing member further comprises two side stop plates respectively provided at the two side edges facing each other.

15. The mount according to claim 14, wherein the upper stop plate, the lower stop plate and the two side stop plates form a second position limiting space at the back surface of the base plate, and an area of the second position limiting space is greater than an area of the lower plate body.

16. The mount according to claim 12, wherein the base is metal, and the fixing member further comprises a magnetic member provided at the back surface of the base plate.

17. The mount according to claim 12, wherein the base plate is metal, and the base further comprises a magnetic member provided at the upper surface of the lower plate body.

18. The mount according to claim 12, wherein one of the base plate and the base is metal, and the other is a magnetic material.

19. The mount according to claim 12, wherein the fixing member weighs more than the base.

20. The mount according to claim 12, wherein a plurality of hollow parts are provided in the lower plate body of the base.

21. The mount according to claim 12, wherein the base and the fixing member are respectively provided at an inner side and an outer side of the garment, and the base and the fixing member are attracted and attached through the garment therebetween.

* * * * *